(12) United States Patent
Cohen et al.

(10) Patent No.: US 9,740,538 B1
(45) Date of Patent: Aug. 22, 2017

(54) MAPPING DATA-FLOWS IN A WORKFLOW (71) Applicants: Michael J Cohen, Flushing, NY (US); William J Mcallister, Holbrook, NY (US)

(72) Inventors: Michael J Cohen, Flushing, NY (US); William J Mcallister, Holbrook, NY (US)

(73) Assignee: CA, Inc., New York, NY (US)

( * ) Notice: Subject to any disclaimer, the term of this patent is extended or adjusted under 35 U.S.C. 154(b) by 552 days.

(21) Appl. No.: 14/011,389

(22) Filed: Aug. 27, 2013

(51) Int. Cl.
*G06F 9/54* (2006.01)
(52) U.S. Cl.
CPC .................................. *G06F 9/54* (2013.01)
(58) Field of Classification Search
CPC ........................................................ G06F 9/54
See application file for complete search history.

(56) References Cited

U.S. PATENT DOCUMENTS

| | | | | |
|---|---|---|---|---|
| 8,381,181 B2* | 2/2013 | Davis | ................... | G06F 8/10 717/120 |
| 8,407,712 B2* | 3/2013 | Davis | ................... | G06Q 10/06 718/106 |
| 2007/0044009 A1* | 2/2007 | Tokunaga | ................... | G06F 8/20 715/202 |
| 2007/0240099 A1* | 10/2007 | Jahn | ................... | G06Q 10/06 717/104 |
| 2012/0053974 A1* | 3/2012 | Kulkarni | ................... | G06Q 10/06 705/7.12 |
| 2013/0103676 A1* | 4/2013 | Kwan | ................... | G06F 17/30864 707/723 |

OTHER PUBLICATIONS

IBM, IBM Business Process Manager Version 7.5.0 Overview of IBM Business Process Manager, pp. 12-16 (2011).

* cited by examiner

*Primary Examiner* — James J Lee
(74) *Attorney, Agent, or Firm* — Baker Botts L.L.P.

(57) ABSTRACT

A method includes determining a service task output definition corresponding to a first property within a first scope of a first service task in a compiled code file, and determining a service task input definition corresponding to a second property within a second scope of a second service task in the compiled code file. The method also includes formatting for display the service task output definition, the service task input definition, and a workflow variable. The method further includes determining a data-flow definition for a workflow process, which includes receiving a first workflow mapping between the service task output definition and the service task input definition, and receiving a second workflow mapping between an output of the second service task and the workflow variable. The method additionally includes determining a value of the workflow variable after execution of the first service task and the second service task.

17 Claims, 7 Drawing Sheets

```
@SwWidgetAnnotation (
        userFriendlyName="Read The File",
        inputs={"fileName"}, outputs = {"firstLine"},
        description = "A task that reads the first line of a file"
        )
public class ReadTheFile extends SWConnector
{
        @SwWidgetInputAnnotation(description = "file name to read",
                isRequired = true, userFriendlyName = "file name")
        public String fileName;

@SwWidgetOutputAnnotation(description = "the first line of file",
                userFriendlyName = "first line content")
        public String firstLine;

```
<root>
<taskMappings taskId="VM Memory"/>

<mapping>
    <fromTask taskId="Run Nexec" name="facname" type="java.lang.String" priority="1"/>
    <to name="facilityName" type="java.lang.String"/>
  </mapping>

<mapping>
    <fromTask taskId="defaultData" name="defaultfacname" type="java.lang.String" priority="2"/>
    <to name="facilityName" type="java.lang.String"/>
  </mapping>

<mapping>
    <fromWF name="myVariable" type="java.lang.String" priority="1"/>
    <to name="facilityType" type="java.lang.String"/>
  </mapping>

<mapping>
    <toWF widgetOutputVarname="returnCode" wfVarName="lastRetCodeVariable"/>
  </mapping>

</taskMappings>
</root>
```

FIG. 7

… # MAPPING DATA-FLOWS IN A WORKFLOW

BACKGROUND

The disclosure relates generally to workflows, and more specifically to a system and method for mapping data-flows in a workflow.

SUMMARY

According to one embodiment of the disclosure, a method includes determining a service task output definition corresponding to a first property within a first scope of a first service task in a compiled code file. The method also includes processing the compiled code file to determine a service task input definition corresponding to a second property within a second scope of a second service task in the compiled code file. The method further includes formatting for display the service task output definition, the service task input definition, and a workflow variable. The method further includes determining a data-flow definition of a workflow process. Determining the data-flow definition includes receiving a first workflow mapping between the service task output definition and the service task input definition. Determining the data-flow definition also includes receiving a second workflow mapping between an output of the second service task and the workflow variable. The method additionally includes determining a value of the workflow variable after execution of the first service task and the second service task in the workflow process.

Other features and advantages of the present disclosure are apparent to persons of ordinary skill in the art in view of the following detailed description of the disclosure and the accompanying drawings.

BRIEF DESCRIPTION OF THE DRAWINGS

For a more complete understanding of the configurations of the present disclosure, needs satisfied thereby, and the features and advantages thereof, reference now is made to the following description taken in connection with the accompanying drawings.

DETAILED DESCRIPTION

As will be appreciated by one skilled in the art, aspects of the present disclosure may be illustrated and described herein in any of a number of patentable classes or context including any new and useful process, machine, manufacture, or composition of matter, or any new and useful improvement thereof. Accordingly, aspects of the present disclosure may be implemented entirely in hardware, entirely in software (including firmware, resident software, micro-code, etc.) or combining software and hardware implementation that may all generally be referred to herein as a "circuit," "module," "component," or "system." Furthermore, aspects of the present disclosure may take the form of a computer program product embodied in one or more computer readable media having computer readable program code embodied thereon.

Any combination of one or more computer readable media may be utilized. The computer readable media may be a computer readable signal medium or a computer readable storage medium. A computer readable storage medium may be, for example, but not limited to, an electronic, magnetic, optical, electromagnetic, or semiconductor system, apparatus, or device, or any suitable combination of the foregoing. More specific examples (a non-exhaustive list) of the computer readable storage medium would include the following: a portable computer diskette, a hard disk, a random access memory (RAM), a read-only memory (ROM), an erasable programmable read-only memory (EPROM or Flash memory), an appropriate optical fiber with a repeater, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device. Program code embodied on a computer readable signal medium may be transmitted using any appropriate medium, including but not limited to wireless, wireline, optical fiber cable, RF, etc., or any suitable combination of the foregoing.

Computer program code for carrying out operations for aspects of the present disclosure may be written in any combination of one or more programming languages, including an object oriented programming language, such as JAVA®, SCALA®, SMALLTALK®, EIFFEL®, JADE®, EMERALD®, C++, C#, VB.NET, PYTHON® or the like, conventional procedural programming languages, such as the "C" programming language, VISUAL BASIC®, FORTRAN® 2003, Perl, COBOL 2002, PHP, ABAP®, dynamic programming languages such as PYTHON®, RUBY® and Groovy, or other programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider) or in a cloud computing environment or offered as a service such as a Software as a Service (SaaS).

Aspects of the present disclosure are described herein with reference to flowchart illustrations and/or block diagrams of methods, apparatuses (systems) and computer program products according to aspects of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable instruction execution apparatus, create a mechanism for implementing the functions/acts specified in the flowchart and/or block diagram block or blocks.

These computer program instructions may also be stored in a computer readable medium that when executed can direct a computer, other programmable data processing apparatus, or other devices to function in a particular manner, such that the instructions when stored in the computer readable medium produce an article of manufacture including instructions which when executed, cause a computer to implement the function/act specified in the flowchart and/or block diagram block or blocks. The computer program instructions may also be loaded onto a computer, other programmable instruction execution apparatus, or other devices to cause a series of operational steps to be performed on the computer, other programmable apparatuses or other devices to produce a computer implemented process such that the instructions which execute on the computer or other programmable apparatus provide processes for implementing the functions/acts specified in the flowchart and/or block diagram block or blocks.

The Business Process Model and Notation (BPMN) 2.0 allows users to define a workflow or process to achieve a goal via the execution of a series of steps of various types in a particular order and fashion as described by a BPMN 2.0 process definition. Various systems and processes implement this standard, each with their own extensions, behaviors and idiosyncrasies. One common step found in such systems is the Service Task. The Service Task often performs the bulk of the data intensive work needed to accomplish the goal of the process definition, via a user-supplied computer program.

The BPMN 2.0 standard and various related workflow systems provide for the description of the expected flow of data through visual annotations within the workflow definition in a documentary fashion. However, these definitions do not drive the actual execution behavior regarding the setting and passing of individual data elements between different Service Tasks that are executed by a process at runtime.

Figure 1:
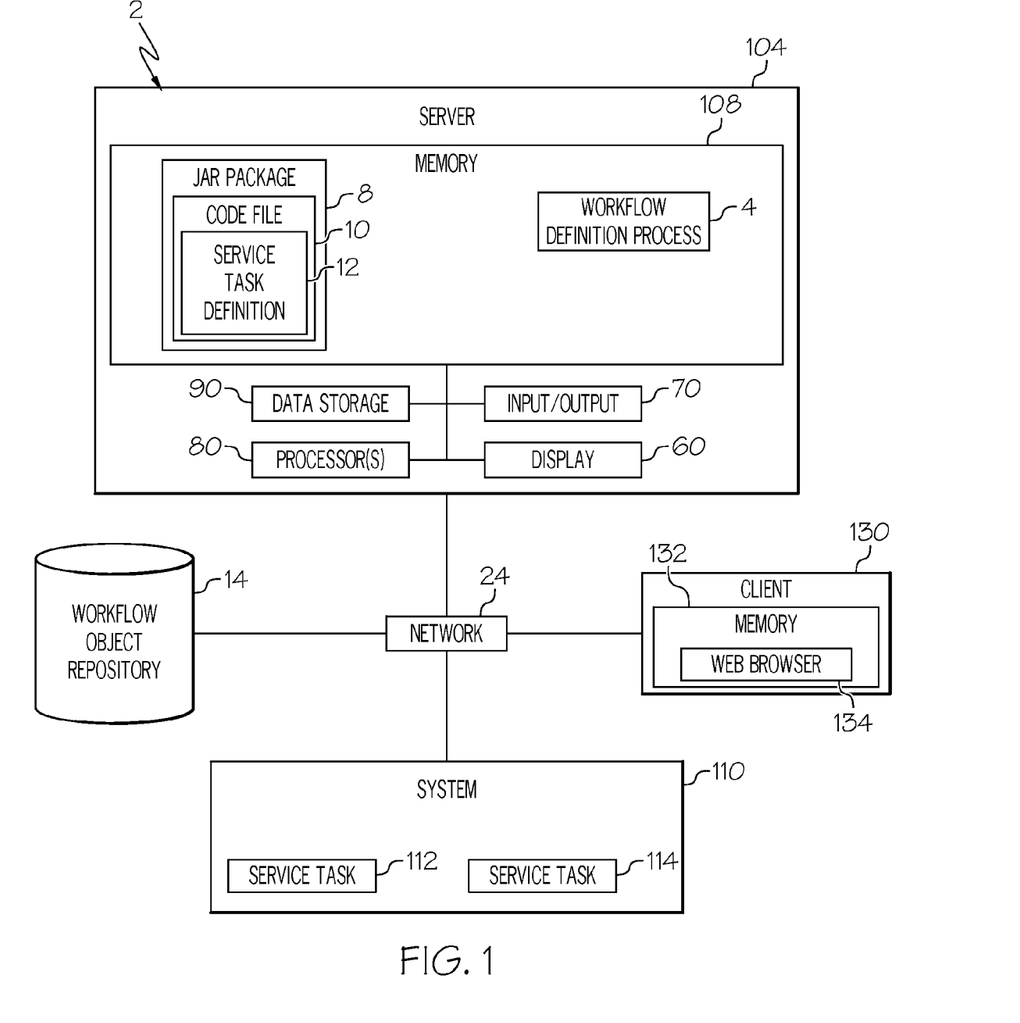
FIG. 1 illustrates a block diagram of a system for mapping data-flows in a workflow in accordance with a particular non-limiting embodiment of the present disclosure.

Referring to FIG. 1, a system 2 for mapping data-flows in a workflow is disclosed in accordance with a particular non-limiting embodiment of the present disclosure. System 2 includes server 104, workflow object repository 14, client 130, and system 110. Server 104 includes processor(s) 80 running a workflow definition process 4 in memory 108. Workflow definition process 4 receives JAR package 8 containing a code file 10. Code file 10 contains code describing a plurality of Service Task definitions 12, as well as input and output variable definitions. These code definitions are annotated with text that describe each variable and service task, and provide usage information relating to each variable and Service Task. For example, Service Task 112 and Service Task 114 in System 110 are part of a workflow process. The source code for each Service Task 112 and 114 is fully and/or partially contained in Jar Package 8. Workflow definition process 4 parses code file 10 for each Service Task Definition 12 and input and output variable definitions and stores this data in memory 108 and/or workflow object repository 14. Workflow definition process 4 displays a graphical user interface (GUI) to the user using display 60 and processor 80. The GUI includes the details parsed from each Service Task, as well as any corresponding input and output variables. The GUI also enables the user to declare workflow variables. Workflow definition process 4 receives workflow mappings from the user through input/output device 70 (e.g., a mouse, keyboard). In certain embodiments, workflow mappings include mapping an output variable to an input variable for another Service Task. In other embodiments, workflow mappings include mapping an output variable to a workflow variable or mapping a workflow variable to an input variable. In certain embodiments, workflow mappings include a data-flow definition that defines the flow of data through a workflow.

In certain embodiments, the user accesses workflow definition process 4 and its associated GUI through Client 130 using network 24. For example, the user uses web browser 134 running on memory 132 of client 130 to access a web interface hosted on server 104. Workflow definition process 4 may handle the backend processing.

In certain embodiments, the user executes the workflow process and checks the status and/or value of workflow variables and input and output variables during system execution. For example, System 110 runs compiled JAR package 8. Workflow definition process 4 monitors Service Task execution on System 110, such as Service Task 112 and Service Task 114 execution. Workflow definition process 4 determines and stores the values of each workflow variable and input/output variable using workflow object repository 14.

In certain embodiments, workflow definition process 4 facilitates initialization and prioritization of user defined variables for input/output variables and workflow variables. Such configurations may also be stored in workflow object repository 14 and retrieved during Service Task execution.

In certain embodiments, workflow definition process 4 facilitates modification of workflow variables and input/output variables defined in the workflow process. For example, a user can modify an initialization value for Service Task 112 input variable as defined in either Service Task Definition 12 or as declared by the user using the GUI. As another example, the value of an output variable for Service Task 112 that is mapped to an input variable for Service Task 114 is modified by the user.

In certain embodiments, workflow definition process 4 facilitates the mapping of inputs, outputs, service tasks, workflow variables, default values, and other variables. In certain embodiments, a data-flow definition includes the mapped variables and components produced by workflow process 4.

Figure 2:
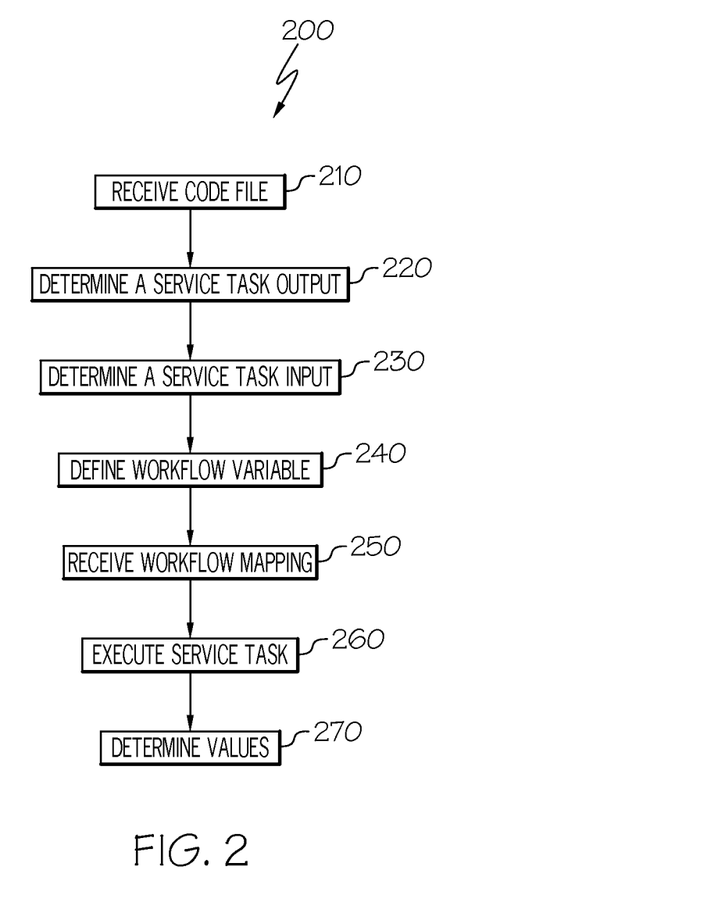
FIG. 2 illustrates a flowchart of a method for mapping data-flows in a workflow in accordance with another non-limiting embodiment of the present disclosure.

Referring to FIG. 2 a method 200 for mapping data-flows in a workflow is illustrated in accordance with a non-limiting embodiment of the present disclosure. The features described with reference to FIG. 1 are used for illustrative purposes to describe method 200.

At step 210, workflow definition process 4 receives a code file 10. Code file 10 contains, for example, one or more Java classes and methods. Each class may include a Service Task Definition, such as Service Task Definition 12.

At step 220, code file 10 is processed and Service Task output variables are determined. At step 230, Service Task input variables are determined. These variables are each associated with respective Service Tasks based on markup in code file 10. Workflow definition process 4 displays the Service Tasks and each Service Task's respective variables to a user using a GUI.

At step 240, workflow variables are defined. Using the GUI, the user declares workflow variables. These variables may be saved in a memory, such as memory 108, a hard disk, such as data storage 90, or a database, such as workflow object repository 14.

At step 250, a workflow mapping is received. For example, a user maps aspects of the workflow's data flow using the GUI. In certain embodiments, a data-flow definition includes the workflow mapping. These mappings can include mapping an output of Service Task 112 to the input of Service Task 114 or mapping workflow variables to existing input/output variables.

At step 260, the workflow process is executed. In execution of the workflow process Service Tasks are executed. As Service Tasks are executed, they may produce output variables and consume input variables. The workflow process executes according to the user mappings.

At step 270, values for input/output and workflow variables are determined during Service Task execution. This includes determining values of variables before, during and after respective Service Task execution. For example, an input variable includes an initialization value that will be used if no values from other variables are supplied to it during run time. In certain embodiments, the user can read through trace logs recorded in workflow object repository 14 that document the variable values throughout workflow process execution.

Figure 3:
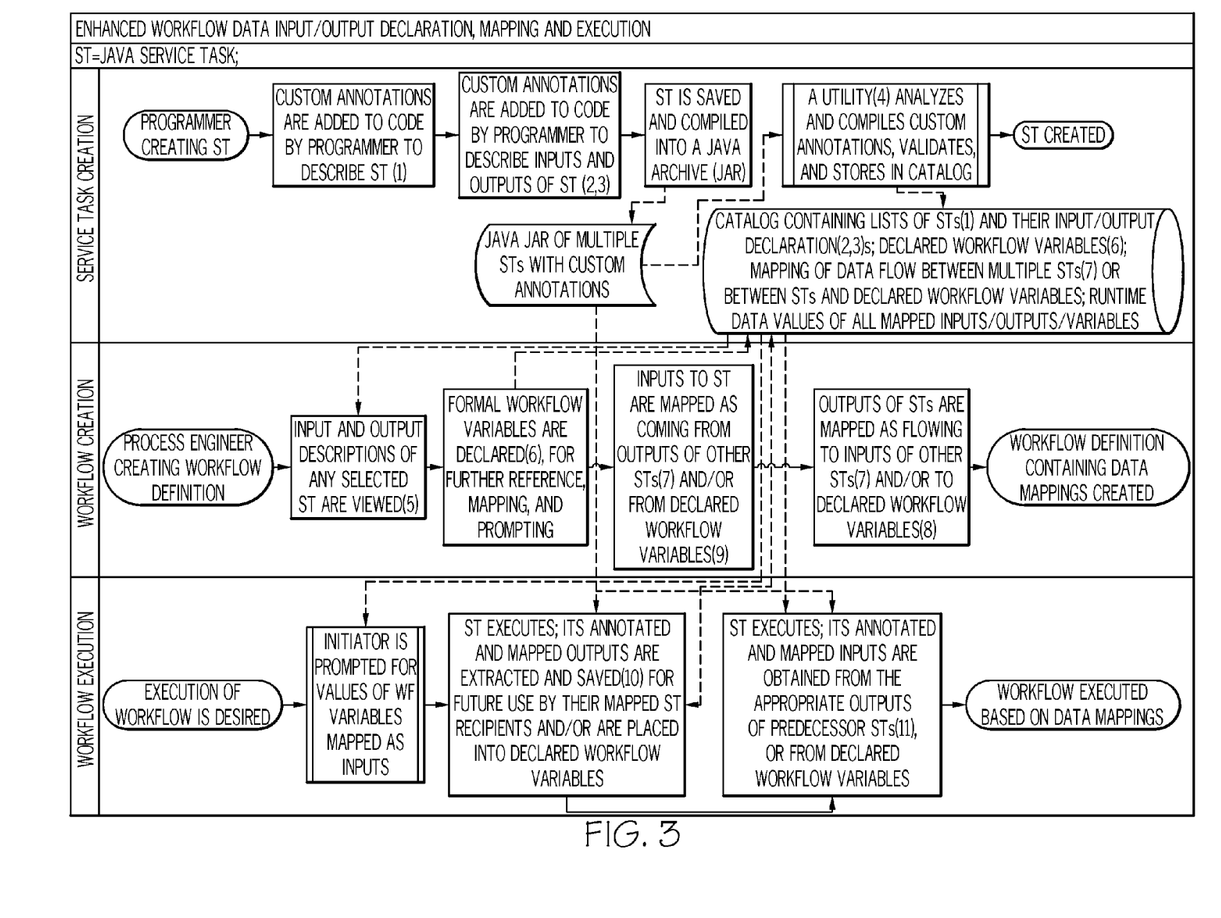
FIG. 3 illustrates a sequence diagram of a method for mapping data-flows in a workflow in accordance with a non-limiting embodiment of the present disclosure.

Referring to FIG. 3, a sequence diagram of a method for mapping data flows within a workflow definition is illustrated in accordance with a non-limiting embodiment. The sequence diagram displays example steps for each process: Service Task creation, Workflow creation, and Workflow execution. The dotted lines show interaction across swimlanes where outputs from some processes are utilized in other processes. For example, the Java JAR package with the custom annotations is created in the Service Task creation process, and executed during the Workflow execution process. Further, the processing utility that parses the annotations from the JAR package catalogs the results for use in the Workflow creation process.

In the Service Task creation process example of FIG. 3, a Service Task is coded in a code file. Custom annotations are added to the code by the programmer to describe the Service Task (an example of Service Task annotations is included in FIG. 4). Custom annotations are added to the code by the programmer to describe input and output variables of the Service Task (an example of these annotations is also included in FIG. 4). The Service Task is saved and compiled. In this example, the Service Task is saved and compiled into a Java Archive (JAR) package. In other embodiments, different programming language file formats may be used without departing from the scope of the present disclosure. The compiled package, including the compiled Service Tasks with custom annotations, is output. A utility analyzes and compiles the custom annotations. Validation is also performed on the extracted annotations. These values are stored in a catalog (e.g., a database, hard disk, or memory). The catalog contains lists of Service Tasks and their input/output declarations (e.g., input/output variable declarations). Declared workflow variables are also stored in the catalog. Data flow mappings as created in the following steps are also stored. Runtime values of each of these mapped inputs, outputs, and variables are also stored in the catalog.

In certain embodiments, a workflow definition is created. Input and output descriptions of selected Service Tasks are displayed. This information may be retrieved from the catalog. Formal workflow variables are declared and utilized using GUI's, mappings, and other user prompts. These workflow variables are stored in the catalog. Inputs to Service Tasks are mapped to outputs of other Service Tasks and/or to declared workflow variables. Outputs of Service Tasks are also mapped as flowing to inputs of other Service Tasks and/or to declared workflow variables. The result is a data-flow definition that contains the data mappings from the workflow creation process. These data flow mapping definitions are stored in the catalog (an example of these definitions is included in FIG. 7).

In certain embodiments of the workflow execution process example of FIG. 3, an initiator of the workflow process is prompted for values of workflow variables mapped as inputs from the Workflow creation process. Service Tasks execute, and annotated and mapped outputs are extracted and saved for future use by their mapped Service Task recipients. In certain embodiments, outputs are placed into declared workflow variables. The mapped outputs are then used as inputs in future Service Task executions, resulting in workflow execution based on the data mappings from the Workflow creation process.

Figure 4:
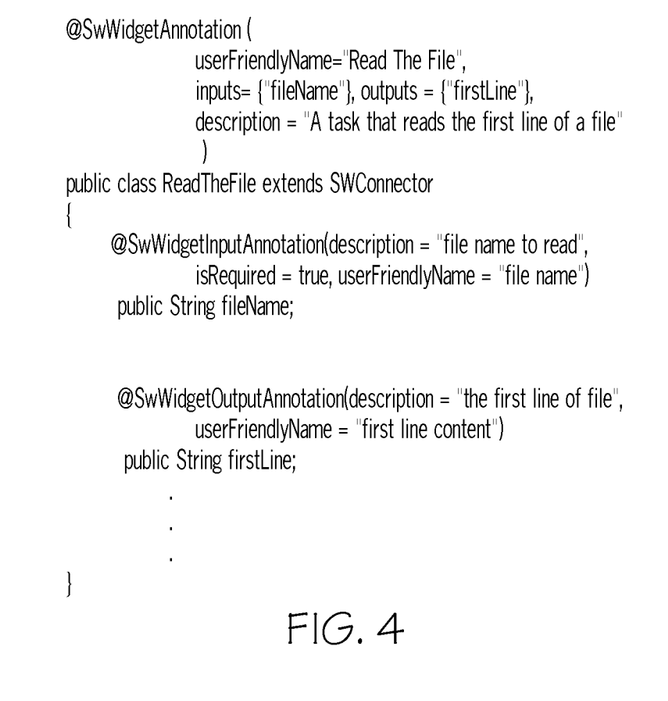
FIG. 4 illustrates example annotations applied to example pseudo-code in a system for mapping data-flows in a workflow in accordance with still another non-limiting embodiment of the present disclosure.

Referring to FIG. 4, example annotations applied to example pseudo-code from a system for mapping data-flows in a workflow is illustrated in accordance with a non-limiting embodiment of the present disclosure. The sample Service Task code illustrated shows an implementation of Service Task Source code annotation entity declaration, input declaration, and output declaration.

For example, annotations may begin with the '@' sign before an annotation name. "@SwWidgetAnnotation" corresponds to a Service Task annotation. The Service Task annotation corresponds to the ReadTheFile class, which may extend a SWConnector class. The Service Task annotation includes a user friendly name, links or references to input and output variable names and a brief description.

As another example, "@SwWidgetInputAnnotation" corresponds to an input variable annotation for the fileName String object. The "@SwWidgetOutputAnnotation" corresponds to an output variable annotation for the firstLine String object. Service task logic follows these declarations. For example, service task logic may be located in an overridden inherited method. In another example, an implemented abstract method contains the Service Task logic. In still other examples a method contains the Service Task logic. Those of ordinary skill in the art will recognize that many different annotation identifiers and semantics may be used to identify annotation and/or metadata sections without departing from the scope of the present disclosure.

Figure 5:
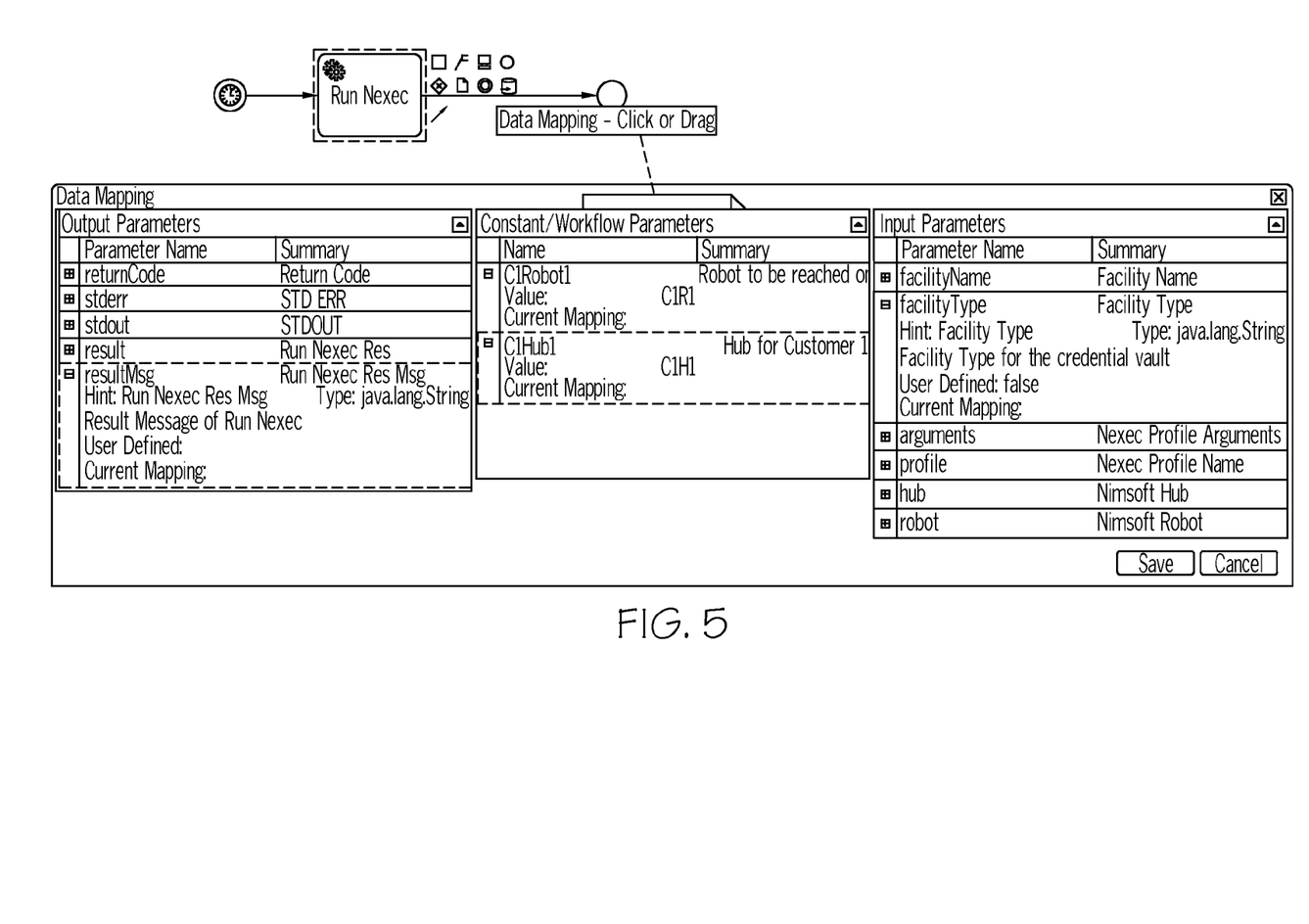
FIG. 5 illustrates an example graphical user interface implementation of a system for mapping data-flows in a workflow in accordance with yet another non-limiting embodiment of the present disclosure.

Referring to FIG. 5 a method for mapping data-flows is illustrated in accordance with another embodiment. The workflow designer GUI illustrated in FIG. 5 depicts a single workflow step whose inputs or outputs are to be mapped to or from workflow variables, and further depicts the interface that pops up when the Data Mapping icon has been clicked to request this functionality.

For example, FIG. 5 indicates the annotation processing utility has been run on the compiled code file. For example, the workflow designer GUI illustrated in FIG. 5 depicts one workflow step whose inputs and/or outputs are to be mapped to or from new or existing workflow variables and further depicts the interface that is displayed when the Data Mapping icon for that step has been clicked to request this functionality. The diagram illustrates an example implementation of mapping workflow variables to Service Task inputs or outputs accomplished by clicking on the source item and dragging it to the destination item. The diagram also illustrates an example implementation of declaring workflow variables, providing default values, and providing a summary that will be used when prompting the workflow initiator for values at runtime. Informative usage information based on annotations in Service Task declarations is provided to the workflow designer. Additionally, required inputs based on annotations in Service Task declarations may display in a designated color, for example, red. Output parameters, constants, and input parameters are identified in a data mapping GUI window.

Figure 6:
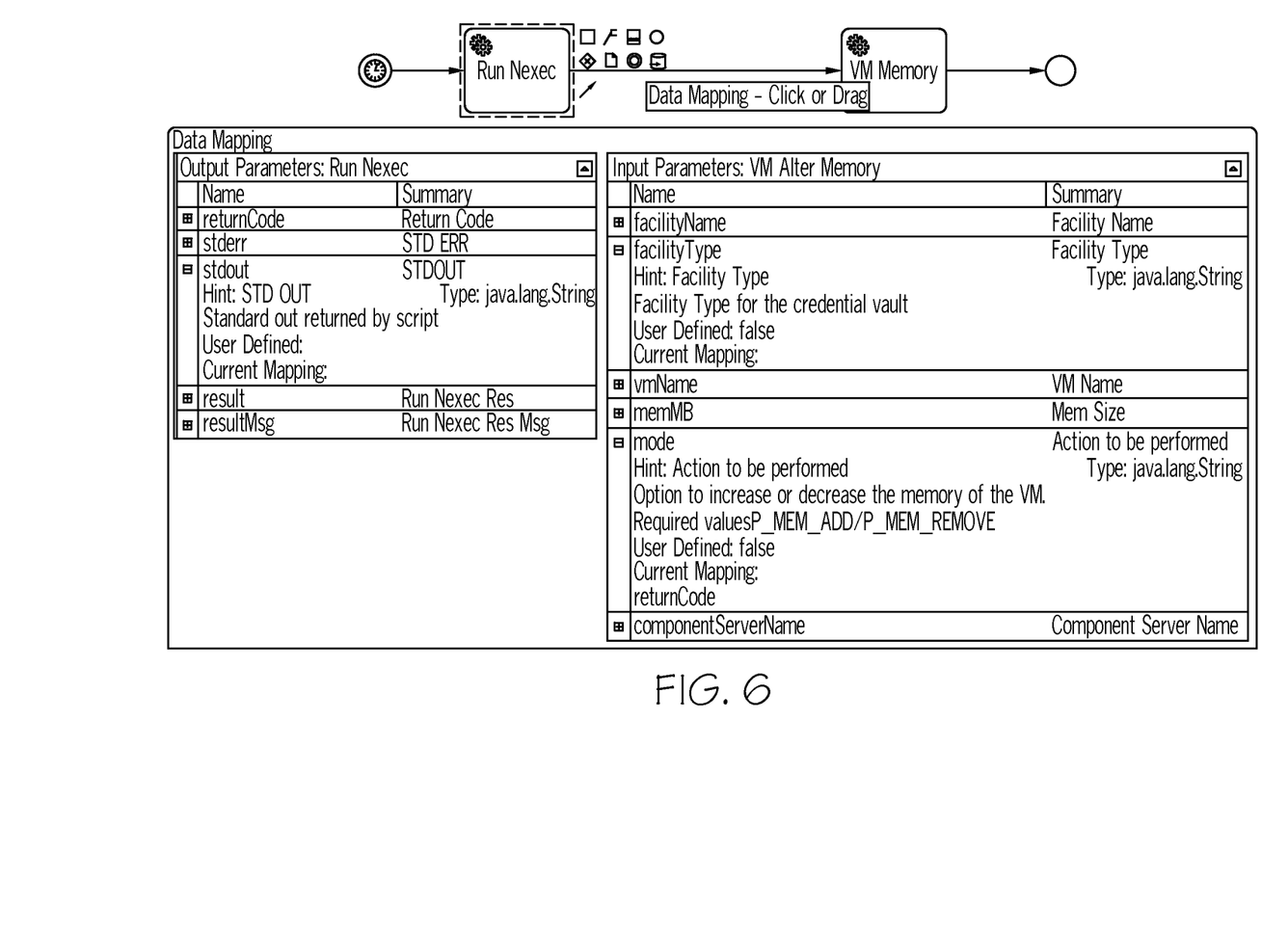
FIG. 6 illustrates yet another example graphical user interface implementation of a system for mapping data-flows in a workflow in accordance with another non-limiting embodiment of the present disclosure.

Referring to FIG. 6 a method for mapping data-flows is illustrated in accordance with another embodiment. The workflow designer GUI illustrated in FIG. 6 depicts two workflow steps where the output(s) of the first step is to be mapped to the input(s) of the second step, and further depicts the interface that pops up when the Data Mapping icon has been dragged from the first step to the second step to request this functionality. The diagram illustrates an implementation of mapping Service Task outputs to Service Task inputs accomplished by clicking on the source item and dragging it to the destination item, extraction and storage of Service Task outputs, and obtaining and initializing Service Task inputs. Informative usage information based on annotations in Service Task declarations is provided to the workflow designer. Additionally, required inputs based on annotations in Service Task declarations may display in a designated color, for example, red.

Figure 7:
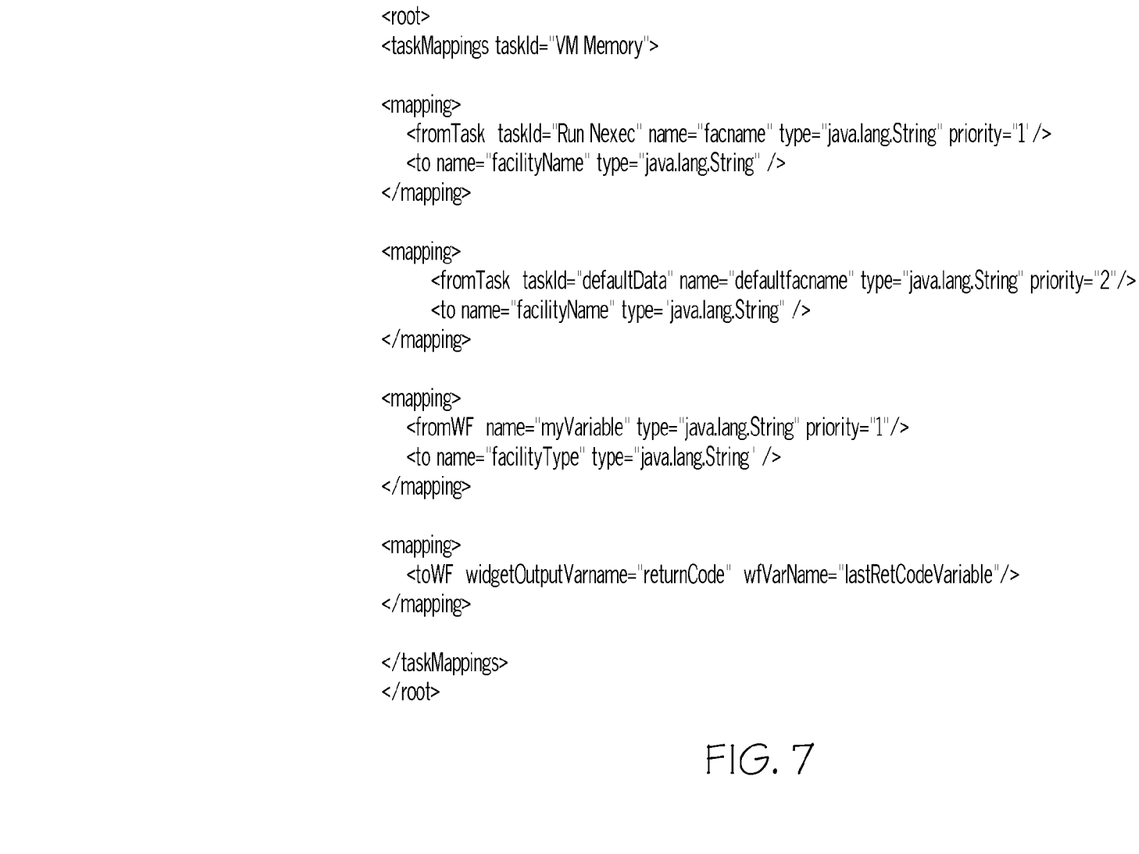
FIG. 7 illustrates an example storage representation of data-flow mappings created in accordance with yet another non-limiting embodiment of the present disclosure.

Referring to FIG. 7, example storage representation of data-flow mappings is illustrated in accordance with a non-limiting embodiment of the present disclosure. The example storage representation illustrated shows an implementation of a data-flow mapping for the inputs and outputs of a particular Service Task designated by the taskMappings tag, named "VM Memory" in this example.

For example, the "facilityName" input variable of the Service Task is mapped to receive its data value from either the "facname" output variable of the higher-priority source "Run Nexec" Service Task, or, if not available, then from the "defaultfacname" output variable of the lower-priority source "defaultData" Service Task.

As another example, the "facilityType" input variable of the Service Task is mapped to receive its data value from the workflow variable named "myVariable", and the data value from the "returnCode" output variable of the Service Task will be placed in the workflow variable named "lastRetCodeVariable".

Certain BPMN workflow systems may not place any restraints on variable definitions and their usage. For example, existing systems may assume that values have been placed in such variables while not requiring the user to define those variables and not ensuring that values have been provided either upon workflow initiation or prior to attempting to reference the contents of the variables.

Certain BPMN workflow systems may allow Service Tasks to access and change process variables belonging to the workflow. This configuration allows values generated by one Service Task to be used by another Service Task. But such configurations lack some of the following features.

Certain BPMN workflow systems may lack visibility of which process variables are manipulated by the Service Task from outside of the code. For example, no means for another component to obtain definitive information about what process variables the Service Task has been coded to expect upon entry is provided. Further, the system may not include a means by which to inform a user which variables the Service Task is going to set during its execution.

Certain BPMN workflow systems may also lack intelligent management capabilities for handling situations where a successor Service Task step depends on certain process variables expected to have been set by a predecessor step. That predecessor step either is not executed due to workflow process logic, or does not set the process variables based on its own conditional logic.

Certain BPMN workflow systems may not provide users the ability to code a Service Task in a generalized fashion. Certain generalized Service Task coding techniques reference a process variable with a fixed name, while allowing multiple occurrences of that one Service Task to appear in the process definition. Certain generalized Service Task coding techniques may allow initiator of the workflow instance to provide different discrete values for each of the occurrences within the process based on some other criteria. The other criteria can include the step name within the process of the particular occurrence of the Service Task.

Certain BPMN workflow systems may not provide users the ability to code Service Tasks such that they directly consume or produce data values represented and accessed within code as standard class members. For example, in a certain BPMN 2.0 implementation using Java code, the data values are not represented as standard Java class members. Allowing data values to be represented and accessed as standard class members for the selected programming language allows values to transparently flow between different Service Tasks appearing in a process definition without the coder of the Service Tasks having to explicitly obtain those values from process variables via an implementation-dependent method call. Such an implementation also frees the developer from having to set the values in a class member explicitly. Additionally, the developer does not have to retrieve the values from a class member and explicitly set those values in process variables via an implementation-dependent method call.

These BPMN workflow systems do not provide users with the ability to specify, outside of any Service Task code, that a successor Service Task should receive as an input a value produced by a particular iteration of a predecessor Service Task where that Service Task is executed by a process step defined as a loop (e.g., multi-instance activity).

Certain existing workflow systems may utilize procedural approaches for passing data between Service Task process steps in an uncontrolled fashion. Such systems are dependent on global process variables without providing visibility as to what data will flow from one step to another and in what circumstances.

Certain embodiments of the present disclosure may assist with some and/or all of the above referenced deficiencies. For example, certain embodiments utilize a declarative approach for defining the transference of data from one Service Task to another in a fashion that provides ease of coding, introspection, and runtime management of situations such as missing data or consumption of data created by a loop. Many other issues identified in the above listing may be improved by the teachings provided in the present disclosure.

The embodiments presented in accordance with the teachings of the present disclosure provide a declarative way to define and manage the flow of required and/or optional data between steps of a BPMN 2.0 automated workflow definition. In certain embodiments, the steps involved are BPMN Service Tasks. The Service Tasks can be, for example, implemented in Java. The Service Tasks may be coded without knowledge of what workflow they will be a part of, where their data will come from, or in what order they will be executed in. The above identified declarations allow for introspection at different stages during the development and execution of the workflow to enhance the ability to assert how data may flow and how extraordinary situations should be handled.

By providing declarative capabilities for inputs and outputs of Service Tasks in a fashion independent of the underlying workflow system, process definition or process variables, the tasks may be self-documented. This self-documenting feature facilitates easy re-use (e.g., in multiple workflow definitions), and enables mapping of the flow of data between individual steps and between the steps and the workflow. Mapping flow data increases the reliability of workflow execution particularly in situations involving missing data or multiple potential or conflicting sources of data.

The embodiments discussed in the present disclosure present a declarative rather than a procedural approach to the coding of input/output access from within a Service Task. In certain embodiments, an execution (runtime) component handles the actual setting or harvesting of variable values. By using this declarative approach within the Service Tasks, example systems provide a unique introspection capability within components. For example, certain embodiments provide a workflow editor so that the designer of a workflow can see accurate information about the Service Tasks and assert how data should flow. In certain embodiments, a unique prioritization mapping scheme allows inputs to be dynamically selected at execution time from multiple potential sources based on the prioritization specified in the mapping declaration.

The teachings of the present disclosure deal with aspects of data input and output related to defining and cataloging Service Tasks. The teachings of the present disclosure further deal with performing data mapping on process definitions that use Service Tasks. The teachings of the present disclosure still further deal with enabling and controlling the flow of data during execution of these processes and Service Tasks.

Certain embodiments include Service Task source code annotation functionality. For example, the source code annotations allow declaration of entities. In this example, a developer of a workflow process Service Task embeds metadata within the source code of the Service Task to allow the Service Task to be identified and manipulated independent of the underlying workflow system, process definition or process variables. The annotations and/or metadata are collocated with the host language entity declaration (e.g., a Java class declaration), and include items such as a user-friendly name by which the Service Task may be referred to; a description of the intended purpose of the Service Task; and a list of those host language (e.g., Java) variables that comprise the inputs to and outputs from the Service Task.

As another example, Service Task source code annotation includes declaration of inputs. A developer of a workflow process Service Task embeds metadata within the source code of the Service Task in a fashion independent of the underlying workflow system, definition or process variables. Such metadata is collocated with each relevant host language variable declaration (e.g., a Java class member declaration) that designates that the host language variable may receive an initial value. The initial input value may be specified at runtime by another Service Task during execution of the workflow process, or may be configured with a default value by the workflow process. The input value includes: a user-friendly name by which the host language variable may be referred to; a description of the intended contents or other semantics of the host language variable; and an indication whether supplying the input value is mandatory or not.

As still another example, Service Task source code annotation includes declaration of outputs. A developer of a workflow process Service Task embeds metadata within the source code of the Service Task in a fashion independent of the underlying workflow system, definition or process variables. Such metadata is collocated with each relevant host language variable declaration (such as a Java class member declaration). The variable declaration designates the host language variable as one whose value is to be obtained as of the end of execution of the Service Task.

Certain embodiments include Service Task catalog utilities. For example, a developer of a workflow process Service Task generates entries in a catalog (e.g., a Database Management System (DBMS)). Such storage may be accomplished in an automated fashion. The resulting database describes and categorizes the Service Task in terms of those items that have been specified in the metadata embedded in the Service Task as part of the previously described aspects of the present disclosure.

Certain embodiments include external visibility of input and output Service Task service task information. For example, the developer of a workflow process definition views (e.g. via a Graphical User Interface or through other access to the catalog) objects for each workflow step referencing a particular Service Task. For example, the developer views inputs as identified by the host language variable name, a user-friendly name and description. These inputs are then cataloged by other aspects of the present disclosure. The inputs are then consumed by the Service Task at run-time. In certain embodiments, sometimes execution of the Service Task may not be dependent on whether or not a value for such inputs is required for the Service Task to execute. However, in some examples, if a Service Task's input includes an annotation indicating that it is mandatory, and no mappings result in a value being provided at runtime, then the Service Task cannot execute and a runtime error may be issued. Outputs, as identified by the host language variable name, user-friendly name, and description, are also provided and cataloged in a database.

Certain embodiments include workflow definitions. For example, workflow variables are defined in a workflow. A user defines a workflow variable while using the facilities described above. Workflow variables are declared by providing a name, an optional initial value and a description that will be used to provide an intelligent prompt for a value upon execution.

As another example, Service Task outputs are mapped to Service Task inputs. In this example, a developer of a workflow process definition references and views (e.g., via a Graphical User Interface or through other access to the catalog produced by another aspect of the present disclosure) the output definitions of one particular selected Service Task. Additionally, input definitions of another (different) particular selected Service Task are viewed. The developer creates a mapping between the input and the output definitions. This mapping indicates which output variables of a particular selected Service Task may, at execution time, have their output values provided as input values to the other particular selected Service Task.

In certain embodiments, these activities are repeatable for all outputs and inputs of all Service Tasks present in the workflow definition such that the multiple inputs of one particular selected Service Task may be mapped as receiving data from zero or more other selected Service Tasks with no limit. The multiple outputs of one particular selected Service Task may be mapped as supplying data to zero or more other selected Service Tasks with no limit.

The effects of these example mapping activities may be recorded in an XML representation that is organized by workflow step. For any one workflow step it may be easily determined what predecessor steps potentially provide data as inputs to that one step.

As still another example, certain embodiments include mapping Service Task outputs to workflow variables. A developer of a workflow process definition references and views (e.g., via a Graphical User Interface or through other access to the catalog produced by another aspect of the present disclosure) output definitions of one particular selected Service Task. The developer also views declarations of workflow variables. Each of these are asserted and saved for future reference via the actions of a Graphical User Interface.

In certain embodiments, a mapping indicates which output variables of a one particular selected Service Task may, at execution time, have their output values captured and placed into the selected workflow variables.

In certain embodiments, workflow variables are mapped to Service Task inputs. A developer of a workflow process definition references and views (e.g., via a Graphical User Interface or through other access to the catalog produced by another aspect of the present disclosure) the input definitions of one particular selected Service Task, along with the declarations of workflow variables. The mappings are saved for future reference via the Graphical User Interface. The mapping may indicate which input variables of the selected Service Task may, at execution time, obtain their respective values from current run-time values from the selected workflow variables.

In certain embodiments, workflow execution is facilitated in accordance with the teachings of the present disclosure. For example, certain embodiments facilitate extraction and storage of Service Task outputs.

In this example, data values are extracted from those annotated and mapped outputs of Service Tasks upon the completion of their execution as part of the workflow. The values are then cataloged in such a way that they are made available to successive steps in the process that may require them. In certain embodiments, the catalog facilitates prioritization, detection of values that were not provided; resilience across system failures; and selection of values produced by a particular iteration of a loop (i.e., multi-instance activity) containing a Service Task.

In certain embodiments, Service Task inputs are obtained and initialized. Data values of those annotated and mapped inputs of Service Tasks are initialized prior to the start of their execution as part of the workflow. Initialization can be based on values from a catalog that stores these values from previous steps of the present disclosure that produced values.

In certain embodiments, appropriate values are determined based on what predecessor steps have had their outputs mapped to this step. These mappings allow for multiple predecessor steps to have their outputs mapped to this step. Those outputs whose values have not been set shall be ignored, and the remaining output with the highest mapped priority shall be used to provide the input.

In certain embodiments, workflow definitions and variables are stored using persistent storage. A catalog, such as a database, stores an organized representation of all data produced or consumed as described in accordance with the present disclosure. Definitions of Service Task information and variables provided by annotations; declarations of workflow variables and their configured default values; mappings of the desired data flow between tasks and between tasks and process variables; and the values produced at execution time of Service Task output variables whose values are to be used by successive steps are all stored in the catalog for later retrieval and use.

The flowchart and block diagrams in the figures illustrate the architecture, functionality, and operation of possible implementations of systems, methods and computer program products according to various aspects of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular aspects only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of any means or step plus function elements in the claims below are intended to include any disclosed structure, material, or act for performing the function in combination with other claimed elements as specifically claimed. The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The aspects of the disclosure herein were chosen and described in order to best explain the principles of the disclosure and the practical application, and to enable others of ordinary skill in the art

What is claimed is:

1. A method for controlling data-flow in a workflow process, the method comprising:
   determining a first input variable and a first output variable associated with a first service task from a first service task definition in a compiled code file;
   determining a second input variable and a second output variable associated with a second service task from a second service task definition in the compiled code file;
   defining a workflow variable, wherein the workflow variable is mapped to an input variable or an output variable of a given service task;
   formatting for display, via a graphical user interface, at least:
      the first service task definition;
      the second service task definition;
      the workflow variable; and
      a data-flow definition;
   determining the data-flow definition of the workflow process, wherein determining the data-flow definition comprises:
      receiving a first workflow mapping between the first output variable of the first service task and the second input variable of the second service task;
      receiving a second workflow mapping between the second output variable of the second service task and the workflow variable; and
      receiving a third workflow mapping between a default value and the first input variable of the first service task;
   executing the workflow process according to the data-flow definition; and
   modifying the second service task definition during the execution of the workflow process to map an output variable of another service task to the second input variable of the second service task, wherein the modifying the second service task definition occurs during execution of the another service task and the second service task, and wherein execution of the first service task comprises:
   receiving an override value;
   replacing the default value with the override value; and
   executing the first service task using the replaced default value.

2. The method of claim 1, further comprising:
   determining a value of the first service task definition after execution of the first service task;
   determining a value of the second service task definition before execution of the second service task; and
   determining a value of the workflow variable after execution of the second service task.

3. The method of claim 1, wherein determining the data-flow definition further comprises receiving a fourth workflow mapping between an initialization value and an input of the first service task, wherein execution of the workflow process comprises execution of a first code task using the mapped initialization value.

4. The method of claim 3, wherein determining the data-flow definition further comprises receiving a fifth workflow mapping between the workflow variable and an input of a third service task, wherein the fifth workflow mapping is received during execution of the workflow process.

5. The method of claim 1, further comprising storing the data-flow definition of the workflow process in a repository.

6. The method of claim 1, wherein the first workflow mapping and the second workflow mapping are received from a drag and drop interface.

7. A computer configured to access a storage device for controlling data-flow in a workflow process, the computer comprising:
   a processor; and
   a non-transitory, computer-readable storage medium storing computer-readable instructions that when executed by the processor cause the computer to perform:
   determining a first input variable and a first output variable associated with a first service task from a first service task definition in a compiled code file;
   determining a second input variable and a second output variable associated with a second service task from a second service task definition in the compiled code file;
   defining a workflow variable, wherein the workflow variable is mapped to an input variable or an output variable of a given service task;
   formatting for display, via a graphical user interface, at least:
      the first service task definition;
      the second service task definition;
      the workflow variable; and
      a data-flow definition;
   determining the data-flow definition of the workflow process, wherein determining the data-flow definition comprises:
      receiving a first workflow mapping between the first output variable of the first service task and the second input variable of the second service task;
      receiving a second workflow mapping between the second output variable of the second service task and the workflow variable; and
      receiving a third workflow mapping between a default value and the first input variable of the first service task;
   executing the workflow process according to the data-flow definition; and
   modifying the second service task definition during the execution of the workflow process to map an output variable of another service task to the second input variable of the second service task, wherein the modifying the second service task definition occurs during execution of the another service task and the second service task, and wherein execution of the first service task comprises:
   receiving an override value;
   replacing the default value with the override value; and
   executing the first service task using the replaced default value.

8. The computer of claim 7, wherein the computer-readable instructions further cause the computer to perform:
   determining a value of the first service task definition after execution of the first service task;
   determining a value of the second service task definition before execution of the second service task; and
   determining a value of the workflow variable after execution of the second service task.

9. The computer of claim 7, wherein determining the dataflow definition further comprises receiving a fourth workflow mapping between an initialization value and an input of the first service task, wherein execution of the workflow process comprises execution of a first code task using the mapped initialization value.

10. The computer of claim 9, wherein determining the dataflow definition further comprises receiving a fifth workflow mapping between the workflow variable and an input of a third service task, wherein the fifth workflow mapping is received during execution of the workflow process.

11. The computer of claim 7, wherein the computer-readable instructions further cause the computer to perform storing the data-flow definition of the workflow process in a repository.

12. The computer of claim 7, wherein the first workflow mapping and the second workflow mapping are received from a drag and drop interface.

13. A computer program product for controlling data-flow in a workflow process, comprising:
a non-transitory computer-readable storage medium having computer-readable program code embodied therewith, the computer-readable program code comprising:
computer-readable program code configured to determine a first input variable and a first output variable associated with a first service task from a first service task definition in a compiled code file;
computer-readable program code configured to determine a second input variable and a second output variable associated with a second service task from a second service task definition in the compiled code file;
computer-readable program code configured to define a workflow variable, wherein the workflow variable is mapped to an input variable or an output variable of a given service task;
computer-readable program code configured to format for display, via a graphical user interface, at least:
the first service task definition;
the second service task definition;
the workflow variable; and
a data-flow definition;
computer-readable program code configured to determine the data-flow definition of the workflow process, wherein determining the data-flow definition comprises:
receiving a first workflow mapping between the first output variable of the first service task and the second input variable of the second service task;
receiving a second workflow mapping between the second output variable of the second service task and the workflow variable; and
receiving a third workflow mapping between a default value and the first input variable of the first service task;
computer-readable program code configured to execute the workflow process according to the data-flow definition; and
computer-readable program code configured to modify the second service task definition during the execution of the workflow process to map an output variable of another service task to the second input variable of the second service task, wherein the modifying the second service task definition occurs during execution of the another service task and the second service task, and wherein execution of the first service task comprises:
receiving an override value;
replacing the default value with the override value; and
executing the first service task using the replaced default value.

14. The computer program product of claim 13, wherein the computer-readable program code further comprises:
computer-readable program code configured to determine a value of the first service task definition after execution of the first service task;
computer-readable program code configured to determine a value of the second service task definition before execution of the second service task; and
computer-readable program code configured to determine a value of the workflow variable after execution of the second service task.

15. The computer program product of claim 13, wherein determining the data-flow definition further comprises receiving a fourth workflow mapping between an initialization value and an input of the first service task, wherein execution of the workflow process comprises execution of a first code task using the mapped initialization value.

16. The computer program product of claim 15, wherein determining the data-flow definition further comprises receiving a fifth workflow mapping between the workflow variable and an input of a third service task, wherein the fifth workflow mapping is received during execution of the workflow process.

17. The computer of claim 13, wherein the computer-readable program code further comprises computer-readable program code configured to store the data-flow definition of the workflow process in a repository.

* * * * *